(12) United States Patent
Feero et al.

(10) Patent No.: US 6,715,351 B1
(45) Date of Patent: Apr. 6, 2004

(54) WHEEL BALANCER DATA ACQUISITION ARM

(75) Inventors: William B. Feero, St. Louis, MO (US); Nicholas J. Colarelli, III, St. Louis, MO (US); Michael D. Gerdes, St. Peters, MO (US); Michael W. Douglas, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/384,409

(22) Filed: Mar. 7, 2003

(51) Int. Cl.$^7$ ................................................ G01M 1/16
(52) U.S. Cl. ......................................... 73/462; 73/487
(58) Field of Search .................................. 73/462, 487

(56) References Cited

U.S. PATENT DOCUMENTS

| | | |
|---|---|---|
| 5,447,064 A | 9/1995 | Drechsler et al. |
| 5,471,874 A | 12/1995 | Rothamel et al. |
| 5,557,043 A | 9/1996 | Dreschler |
| 5,587,528 A | 12/1996 | Rothamel et al. |
| 5,915,274 A | 6/1999 | Douglas |

*Primary Examiner*—Richard A. Moller
(74) *Attorney, Agent, or Firm*—Polster, Lieder, Woodruff & Lucchesi (57) ABSTRACT

A improved vehicle wheel balancer for a wheel assembly including an adjustable wheel data acquisition arm configured to transition from at least a first operating position adapted for use with vehicle wheels having a first range of inner diameters, to at least a second operating position adapted for use with vehicle wheels having a second range of inner diameters which differ, at least in-part, from the first range of inner diameters.

21 Claims, 9 Drawing Sheets

WHEEL BALANCER DATA ACQUISITION ARM

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to a vehicle wheel balancer system or wheel vibration control system configured with an wheel data acquisition arm, and in particular to a wheel data acquisition arm configured with an extended range of motion to accommodate wheel rims of differing inner diameters.

Figure 1:
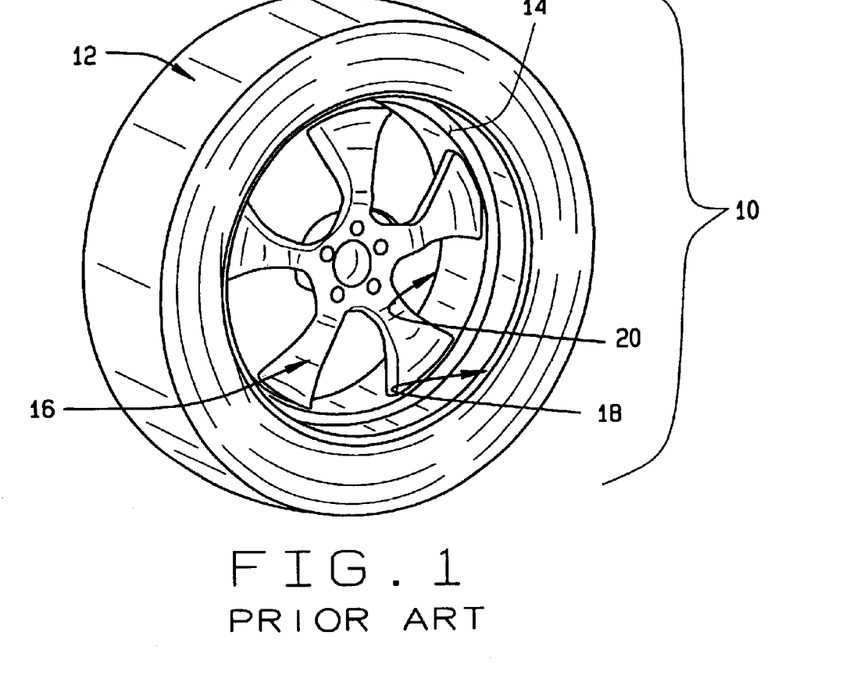
FIG. 1 is a perspective view of a conventional wheel assembly.

Vehicle wheel assemblies, such as shown at 10 in FIG. 1, consist of a pneumatic tire 12 mounted to a wheel rim 14. The size and configuration of the wheel rim 14 may vary greatly between different vehicle wheel assemblies. These variations may include the number of spokes 16, the setback of the spokes from the inner edge 18 or outer edge 20 of the rim 14, the width of the rim 14, the diameter of the rim 14, and the shape or contour of the rim 14. Currently, the U.S. Department of Transportation has approved, for use on passenger cars and light trucks, a maximum wheel rim diameter of 24 inches, however, wheel rim diameters of 26" or greater are likely to be approved for use in the United States in the near future.

Figure 2:
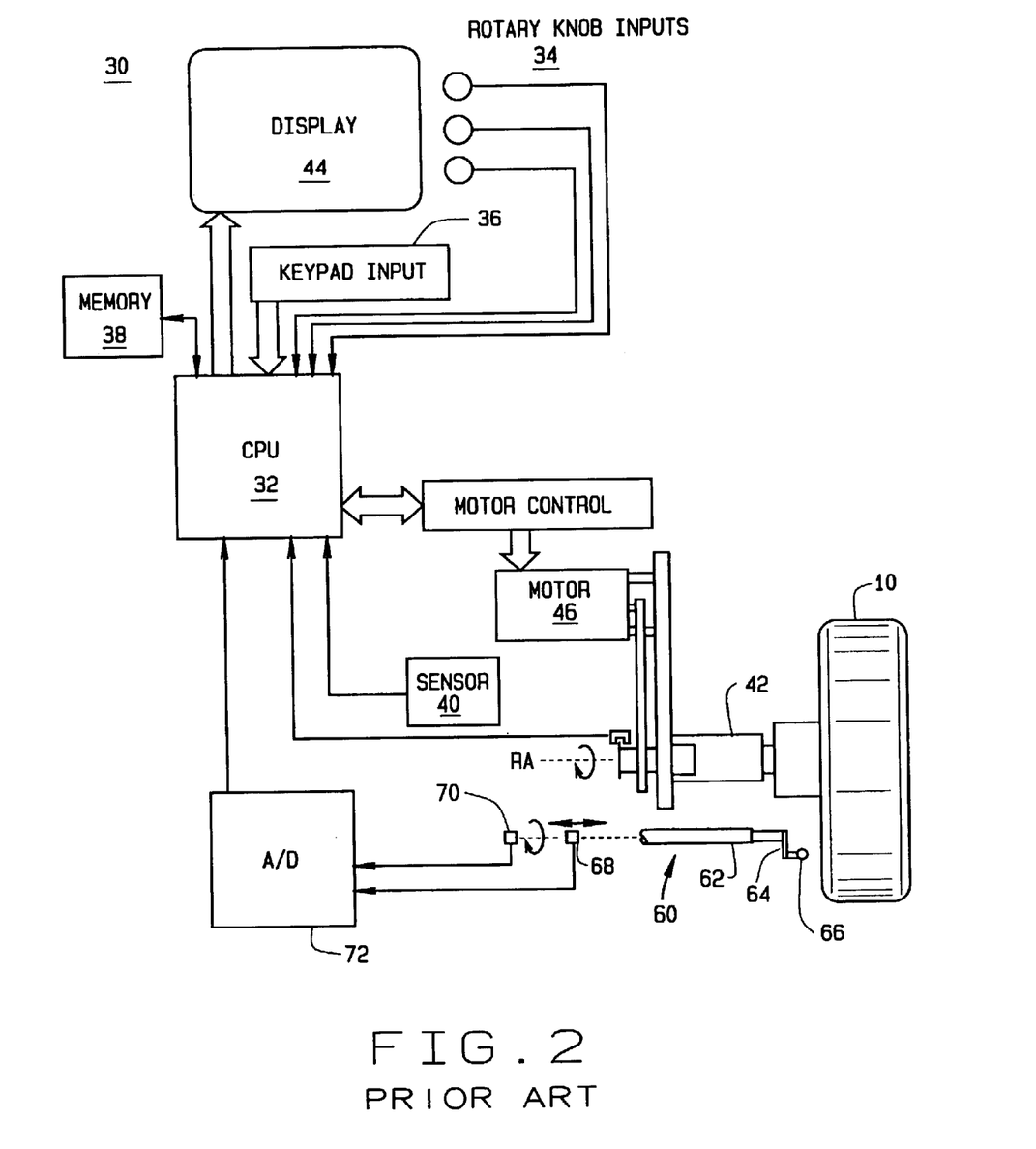
FIG. 2 is a block diagram view of the basic components of a conventional vehicle wheel balancer system.

Conventional vehicle wheel balancing systems or wheel vibration control systems, such as shown at 30 in FIG. 2, include a central processing unit 32, such as a general purpose computer, digital signal processor, or other suitable logic circuit, configured with a software application to identify and correct forces and imbalances in vehicle wheel assemblies 10. The central processing unit 32 receives input from a number of sources, including knobs 34 and keypads 36 for operator input, a memory 38, and one or more imbalance force sensors 40 disposed in operative relationship to a motor driven spindle or shaft 42 upon which a wheel assembly 10 undergoing a balance procedure is mounted.

Imbalance and force measurements, together with other informational output from the central processing unit 32 are displayed to an operator on a video display 44 unit such as a CRT, LCD screen, or LED panel. In addition, the central processing unit 32 is configured to control a motor 46 or other drive unit to regulate the rotational movement and position of the shaft or spindle 42 upon which the wheel assembly 10 is mounted. In some wheel vibration control systems, such as the GSP 9700 Series system, manufactured by Hunter Engineering Co. of Bridgeton, Mo., and shown in FIG. 3, the central processing unit 32 is configured to control a load roller 50 to apply a load to a wheel assembly during rotational movement thereof. The central processor 32 receives feedback from one or more sensors associated with the load roller 50, indicative of radial or lateral forces exerted by the rotating wheel assembly 10.

Figure 4:
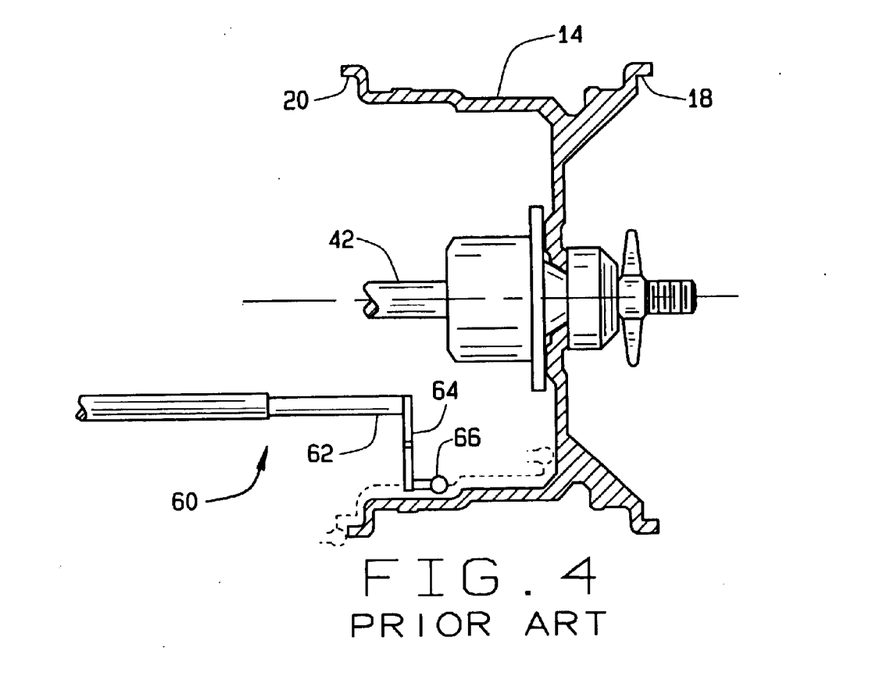
FIG. 4 is a side sectional view of a wheel rim mounted to a balancer spindle, illustrating the range of axial motion of a conventional wheel data acquisition arm.

One function of a vehicle wheel balancer or vibration control system is to identify, to an operator, the location on a wheel rim at which an imbalance correction weight should be applied to correct a detected imbalance in the wheel assembly. Conventionally, as shown in FIG. 4, a at least one multi-function wheel data acquisition arm 60 is utilized to facilitate the weight placement process. The wheel data acquisition arm 60 is disposed parallel to, and adjacent the shaft or spindle 42 upon which the wheel assembly 10 is mounted. A typical wheel data acquisition arm 60 consists of an extending and rotating shaft 62, and a perpendicular rim contact arm 64 affixed to an end of the shaft 62. Alternate designs, such as shown in U.S. Pat. No. 5,447,064 to Drechsler et al., utilize a single telescoping arm secured at a pivot point. A roller or ball 66 is disposed at the end of the rim contact arm 64, and is configured to provide a known contact point between the wheel data acquisition arm 60 and the wheel rim 14. Optionally included at the end of the rim contact arm 64 is an imbalance weight holder or clip, configured to hold an imbalance correction weight to aid in placement on a wheel rim 14.

Figure 3:
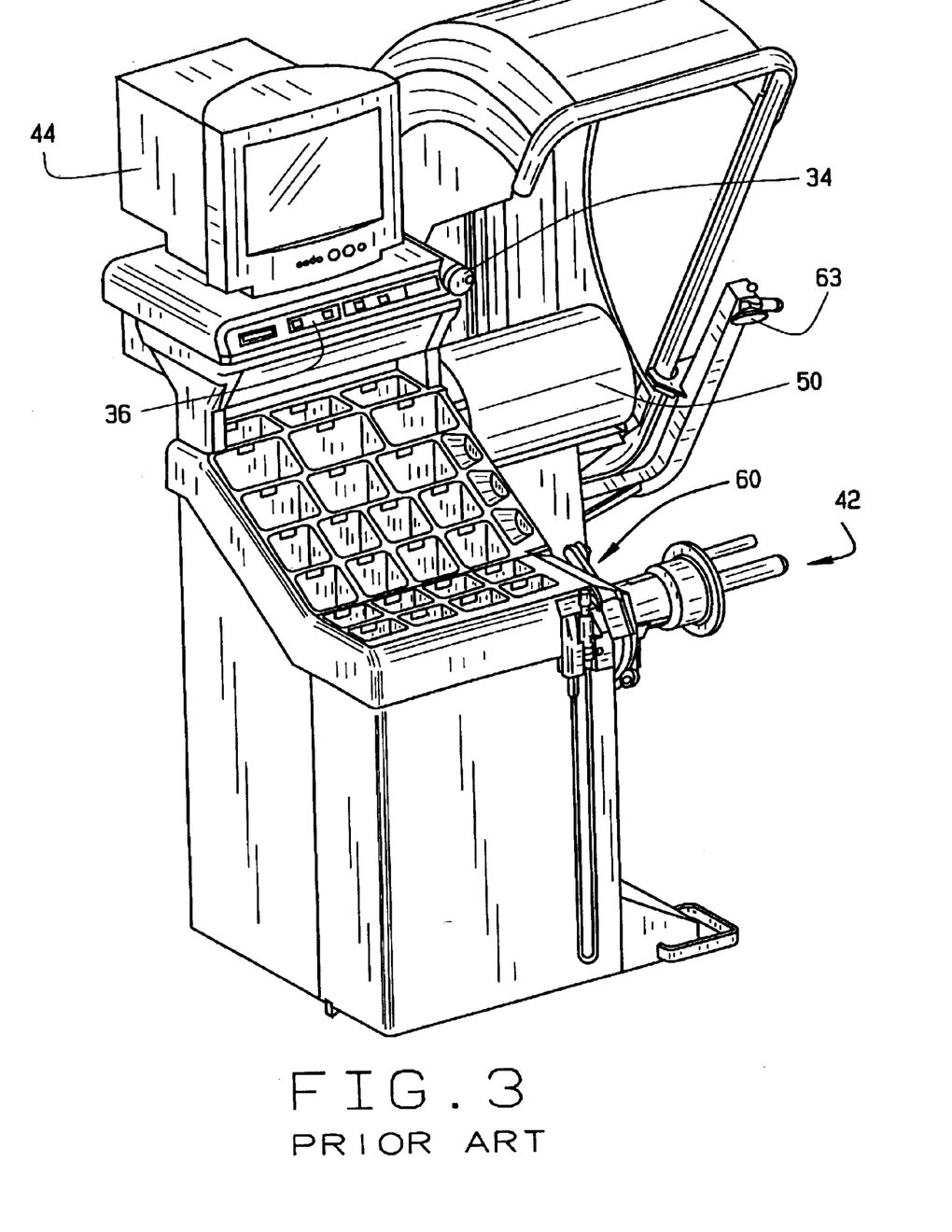
FIG. 3 is a perspective view of a prior art vehicle wheel balancer configured with a load roller and hood.

As seen in FIG. 3, some vehicle wheel balancer or vibration control systems 30 include a second, outer wheel data acquisition arm 61 configured with a roller or ball 63. While the typical wheel data acquisition arm 60 contacts the inner wheel rim 20, or wheel rim surfaces disposed adjacent the balancer or vibration control system 30 when the wheel rim is mounted to the shaft or spindle 42, the second or outer wheel data acquisition arm 61 is disposed to contact the outer wheel rim lip 18. Conventionally, the second or outer wheel data acquisition arm 61 is a fixed length structure capable of rotating through a large arc.

During use, with a wheel installed on the balancer shaft or spindle, the shaft 62 of the wheel data acquisition arm 60 is extended such that the perpendicular rim contact arm 64 is positioned within the center portion of the wheel rim 14. Rotation of the wheel data acquisition arm 60 about the axis of the shaft 62 swings the rim contact arm 64 into contact with an inner surface of the wheel rim 14, at a known angular position for wheel rims of known diameters. Axial movement of the wheel data acquisition arm 60 is tracked by a displacement sensor 68, while rotational movement about the axis is tracked by a rotational sensor 70, with may be either a relative rotational position sensor, or an absolute rotational position sensor. Analog signals from the sensors 68 and 70 are typically converted into digital form via a converter 72, and routed to the central processing unit 32.

When combined with computer controlled rotation of the wheel assembly 10 about the balancer shaft or spindle 42, the movement of the wheel data acquisition arm 60 either delivers an imbalance correction weight carried by a weight holder or clip to a calculated angular position on a wheel rim 14, or provides an operator with a clear visual indication of the weight placement location by contacting the roller or ball 66 at the intended weight placement location.

In addition, by tracking the axial movement of the shaft of the wheel data acquisition arm, and the rotational movement of the rim contact arm about the shaft axis, using sensors 68 and 70, the central processing unit of a conventional wheel balancer system can determine the dimensions, contours, and runout parameters of a wheel rim mounted to the balancer shaft or spindle, as described in U.S. Pat. No. 5,915,274 to Douglas. Determining the dimensions, contours, and runout parameters of the wheel rim permits the central processing unit to identify optimal imbalance correction weight planes, and to present the operator with the best imbalance correction weight arrangement.

Using the determined dimensions, contours, and runout parameters of the wheel rim, the central processing unit 32 of the balancer 30 effectively has an infinite number of imbalance correction planes in which to place imbalance correction weights. The best plane locations, amount of weight, and even the number of weights, are calculated to result in a minimized residual static and dynamic imbalance while still using incrementally sized weights. The display 44 associated with the balancer system 30 is used to show the actual scanned contour of the wheel rim 14, as well as the relative locations of the weights on the displayed wheel rim 14, enhancing operator understanding and providing confidence that the measuring apparatus is working correctly. However, actual placement of the imbalance correction weights in the identified optimal balance correction planes, and at the ideal rotational positions, must still be done manually by an operator, guided by instructions displayed on the wheel balancer, and aided by the wheel data acquisition arm.

Figure 5:
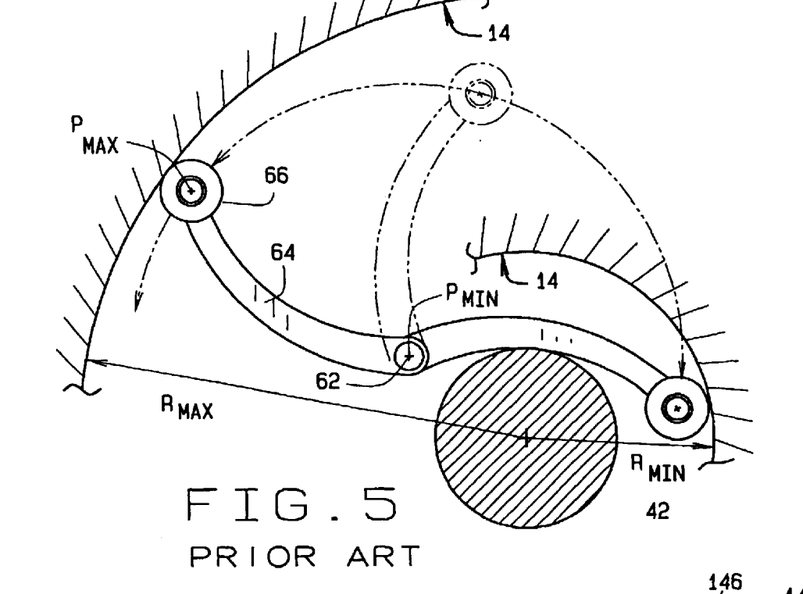
FIG. 5 is an end view of the rotational range of motion for a conventional wheel data acquisition arm.

The use of a conventional wheel data acquisition arm 60 is, however, limited to wheel rims 14 having an inner diameter in a range between 10.0–22.0 inches, due to mechanical limitations. As seen in FIG. 5, the rim contact arm 64 can rotate about the wheel data acquisition arm shaft 62 between a maximum outward position $P_{max}$, and a minimum inward position $P_{min}$. Rotation of the rim contact arm 64 past the maximum outward position $P_{max}$ reduces the distance between the rim contact arm 64 contact point on the wheel rim 14 and the axis of rotation for the wheel rim about the balancer shaft 42. Correspondingly, the minimum inward rotational position $P_{min}$ is defined as the point at which the rim contact arm 64 swing is blocked from further rotation by the balancer shaft or spindle 42 upon which the wheel rim 14 is mounted.

Alternative designs for the wheel data acquisition arm 60, such as shown in U.S. Pat. No. 5,447,064 to Drechsler et al. which telescope from a single pivot point, are capable of contact surfaces of wheel rims 14 having greater ranges of diameters, However, due to the mechanical geometry of these designs, they are incapable of determining, with necessary precision, a pivot angle for the telescoping arm sufficient to permit identification of a wheel rim runout.

Accordingly, it will be appreciated that there is a need for a wheel balancer system to include a wheel data acquisition arm which is capable of contacting the inner surfaces of both large and small diameter wheel rims mounted to a balancer shaft or spindle.

BRIEF SUMMARY OF THE INVENTION

Briefly stated, a vehicle wheel balancer system of the present invention incorporates an wheel data acquisition arm configured to transition between at least a first operating position adapted for use with vehicle wheels having a first range of diameters, and at least a second operating position adapted for use with vehicle wheels having a second range of diameters which differ, at least in-part, from the first range of diameters.

In an alternate embodiment, the central processing unit of the vehicle wheel balance system is configured to identify the operating position of the wheel data acquisition arm.

In an alternate embodiment, the wheel data acquisition arm is further configured with an eccentric roller to generate a cyclic signal when the eccentric roller is in contact with the inner surface of a rotating wheel rim during a runout measurement procedure. The central processing unit of the vehicle wheel balancer system is correspondingly configured to utilize the cyclic signal to estimate a diameter of the wheel rim and to identify an operating position of the wheel data acquisition arm.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 6:
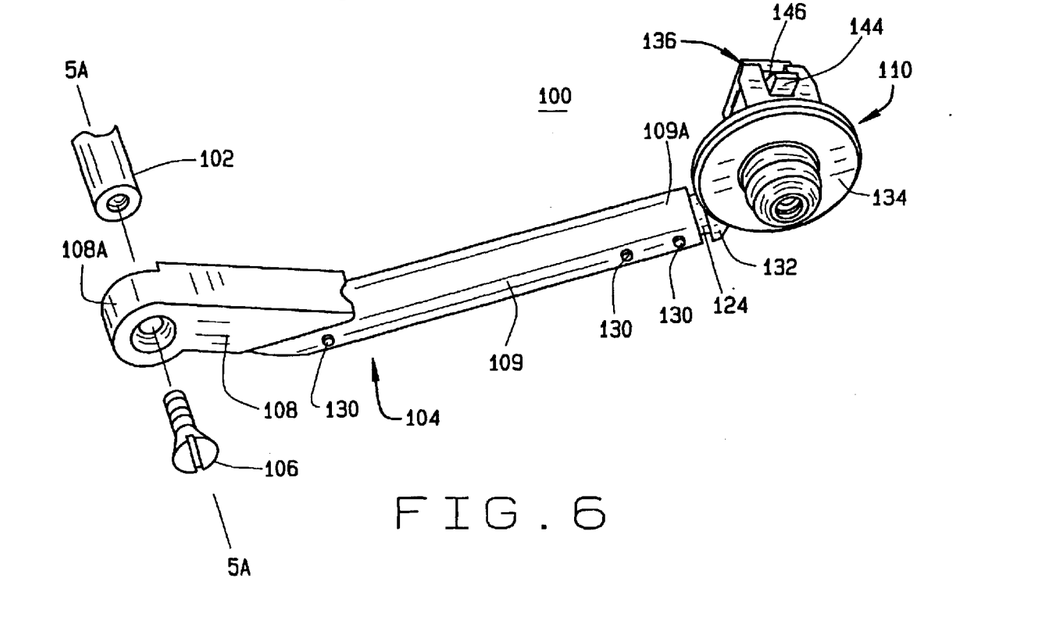
FIG. 6 is an perspective view of an adjustable wheel data acquisition arm of the present invention in the retracted position.
Figure 7:
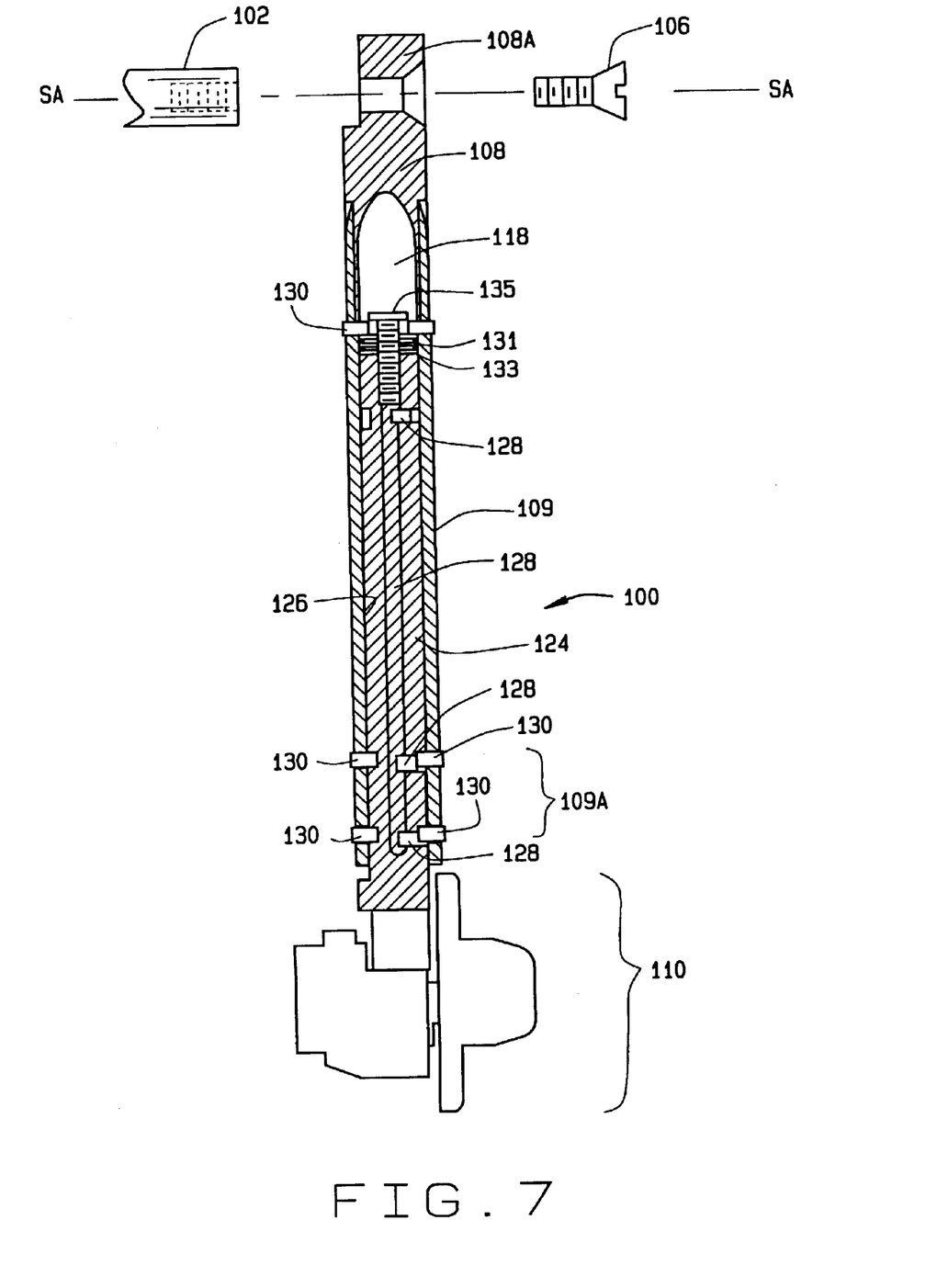
FIG. 7 is a sectional view of the adjustable wheel data acquisition arm of FIG. 6, in a retracted position, with the roller and weight clip shown in outline.

Turning to FIGS. 6 and 7, a wheel data acquisition arm of the present invention is shown generally at 100. The wheel data acquisition arm 100 consists of a shaft 102 adapted for operative coupling to a vehicle wheel balancer system in place of a conventional wheel data acquisition arm, such as shown at 60 in FIGS. 2–5. An adjustable length rim contact arm 104 is secured by a screw 106 to and end of the shaft 102. The rim contact arm 104 is disposed perpendicular to the longitudinal axis of the shaft 102, such that rotation of the shaft 102 results in rotation of the rim contact arm 104 through a corresponding arcuate distance.

Preferably, the rim contact arm 104 consists of a base 108, secured at a posterior end 108A to the shaft 102, and an extension arm 109 supporting a roller head 110 on a anterior end 109A. The base 108, as shown in FIG. 6, supports the extension arm 109 at an angle, displacing the extension arm 109 from the axis of the shaft 102. The displacement is preferably selected to permit the rim contact arm 104 to have a range of motion which includes access to a region disposed behind the balancer shaft 42, as best seen in FIG. 5. Those of ordinary skill in the art will recognize that the angle at which the extension arm 109 is supported by the base 108 is dependent upon the specific geometry of the wheel balancer 60 and the relative placement of the wheel data acquisition arm 100, as compared to the balancer shaft 42. In some applications, a greater angle will be required, and in some applications, the base 108 and angle may be eliminated, and the extension arm 109 extended between the shaft 102 and the roller head 110.

The elongated arm 109 is hollow, defining an interior space 118. The roller head 110 is coupled to the anterior end 109A of the extension arm 109 by a sliding member 124 disposed within a passage 126 in the extension arm 109. The sliding member 124 is adapted for sliding movement with the passage 126, between a first or retracted position, shown in FIGS. 6 and 7, and a second or extended position, shown in FIGS. 8 and 9. Preferably, the sliding member 124 is fitted with one or more interconnected slots 128, which engage corresponding dowel pins 130 within the passage 126, providing a releasable engagement in the first and second positions. A spring 131 is retained between a pair of floating washers 133 by a bolt 135 threaded into the base of the sliding member 124. The floating washers 133 engage one or more dowel pins 130 in the extended and retracted positions of the sliding member 124, providing a resilient retaining force.

Those of ordinary skill in the art will recognize that the slots 128 and dowel pins 130 may be replaced by any suitable elements configured to provide a releasable engagement for the sliding member 124 within the passage 126. For example, the sliding member 124 may be adapted for unimpeded motion along the length of passage 126, and to be secured in place with one or more conventional set screws (not shown) disposed in extension arm 109.

It is also possible that other components may be used to create an extendable arm, and as such, the above description is not meant to be limiting. For example the round members may be replaced by flat or rectangular members without compromising the function of the device.

Figure 8:
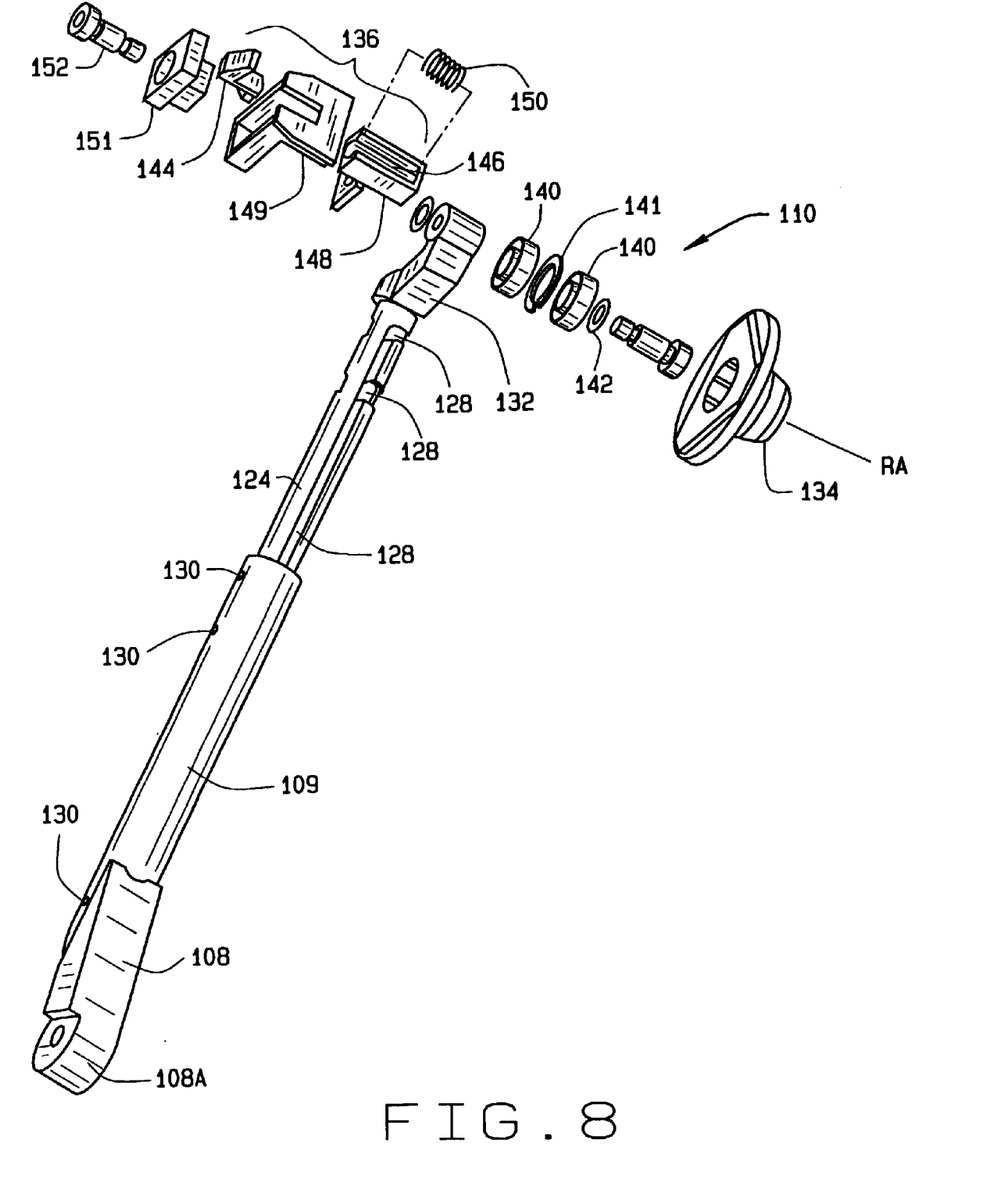
FIG. 8 is a perspective exploded view of the adjustable wheel data acquisition arm of FIG. 6, in an extended position.
Figure 9:
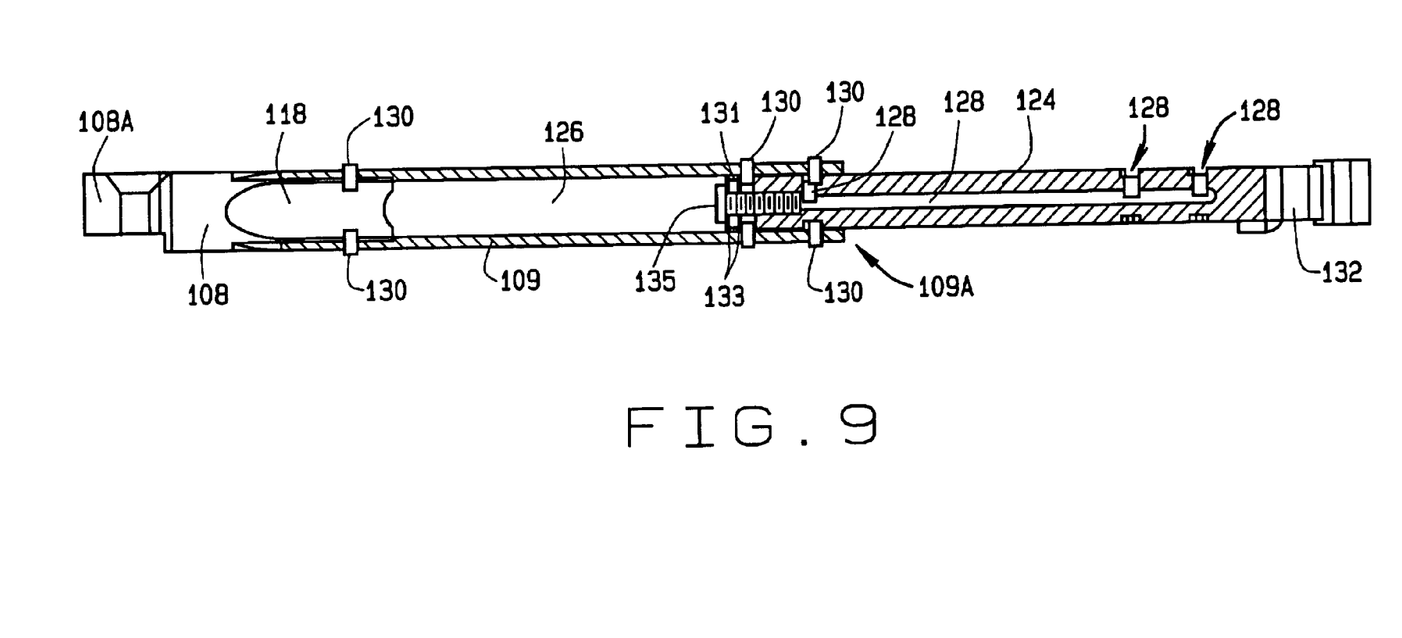
FIG. 9 is a sectional view of the adjustable wheel data acquisition arm of FIG. 8, with the roller and optional weight clip removed for clarity.

As best seen in FIG. 8, roller head 110 is conventional in design, and preferably consists of a support 132 secured to the sliding member 124, a roller 134, and an optional imbalance correction weight holder 136. The roller 134 is disposed on a shoulder screw 138 which is secured within the support 132 for rotational movement about a longitudinal axis RA parallel to the axis SA of shaft 102. One or more bearings 140, retainer rings 141, and wave springs 142 facilitate the rotational movement of the roller 134 and shaft 138 relative to the roller head 110.

Roller 134 is configured to contact an inner surface of a wheel rim 14 during rotational movement of the wheel rim 14. Accordingly, the dimensions of the roller 134, and the geometry of the rim contact arm 104 in general, must be known to a predetermined tolerance, permitting the wheel balancer or vibration control system 60 to identify a wheel rim radius based on a measured rotational position of the rim contact arm 104 about the shaft 102, when the roller 134 is in contact with the wheel rim 14.

The optional imbalance correction weight holder 136 disposed on the roller head 110 is conventional in design, and preferably includes an imbalance correction weight clamp 144 adapted for sliding movement within a channel 146 in a spring housing 148 seated on a weight lever 149. A resilient member 150, such as a coil spring, provides an engaging force on the imbalance correction weight clamp 144. The imbalance correction weight holder 136 is secured to the support 132 by a retainer 151 and a shoulder screw 153.

During use, the imbalance correction weight clip 144 is displaced within the channel 146, compressing the resilient member 150, and an imbalance correction weight (not shown) is seated on the weight clip 144. The resilient member 150 urges the weight clip 144, and the seated imbalance correction weight, into engagement against an edge of the roller 134, releasably securing the imbalance correction weight. The roller head 110 is moved into position adjacent a predetermined point on a wheel rim 14, and the imbalance correction weight is transferred from the weight clip 144 to the wheel rim 14 in a conventional manner. Those of ordinary skill in the art will recognize that a variety of mechanical configurations may be utilized in the imbalance correction weight hold 136 to releasably hold an imbalance correction weight for delivery to the surface of a wheel rim 14.

Figure 10:
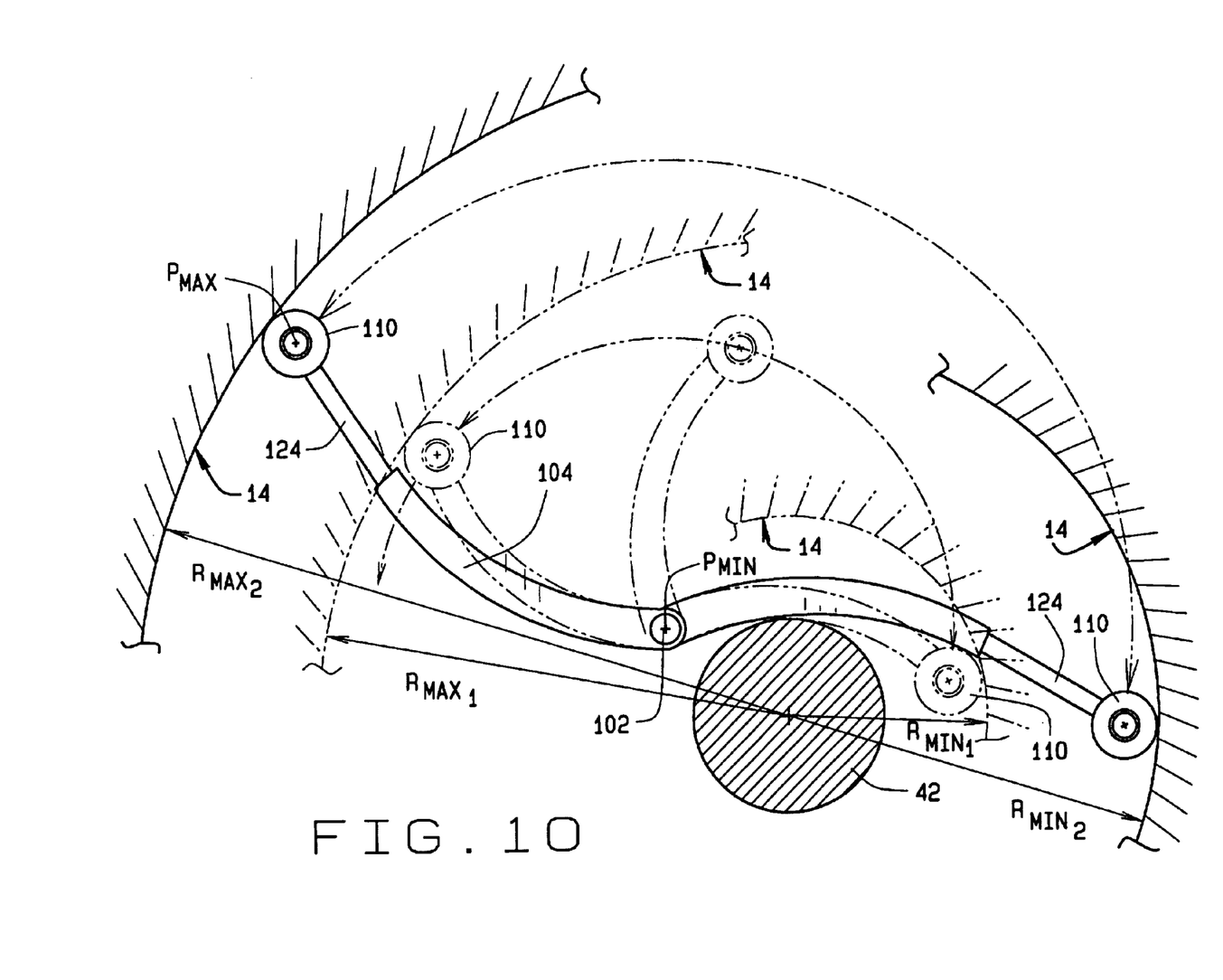
FIG. 10 is an end view of the extended range of motion for an adjustable wheel data acquisition arm of FIG. 6.

As seen in FIG. 10, during use, the rim contact arm 104 can rotate about the wheel data acquisition arm shaft 102 between a maximum outward position $P_{max}$, and a minimum inward position $P_{min}$. Rotation of the rim contact arm 104 past the maximum outward position $P_{max}$ reduces the distance between the rim contact arm 104 contact point on the wheel rim 14 and the axis of rotation for the wheel rim about the balancer shaft 42. Correspondingly, the minimum inward rotational position $P_{min}$ is defined as the point at which the rim contact arm 104 swing is blocked from further rotation by the balancer shaft or spindle 42 upon which the wheel rim 14 is mounted. As can be further seen in FIG. 10, use of the rim contact arm 104 with the sliding member 124 in a first or retracted position permits use with wheel rims 14 having a first range if diameters, $R_{min1}$ to $R_{max1}$.

Extending the sliding member 124 to a second or extended position permits use with wheel rims 14 having a second range of diameters, $R_{min2}$ to $R_{max2}$, where $R_{min2} > R_{min1}$ and $R_{mas2} > R_{max1}$. For example, with the sliding member 124 in the first or retracted position, $R_{min1}=5"$ and $R_{max1}=11"$ and with the sliding member 124 in the second or extended position, $R_{min2}=11"$ and $R_{max2}=15"$. Those of ordinary skill in the art will recognize that the length of sliding member 124 may be selected based upon the desired extension range for the rim contact arm 104, and that alternate sliding members 124 having differing lengths may exchanged as required to achieve the desired extension range for wheel rims 14 of varying sizes.

Figures 11, 12, 13:
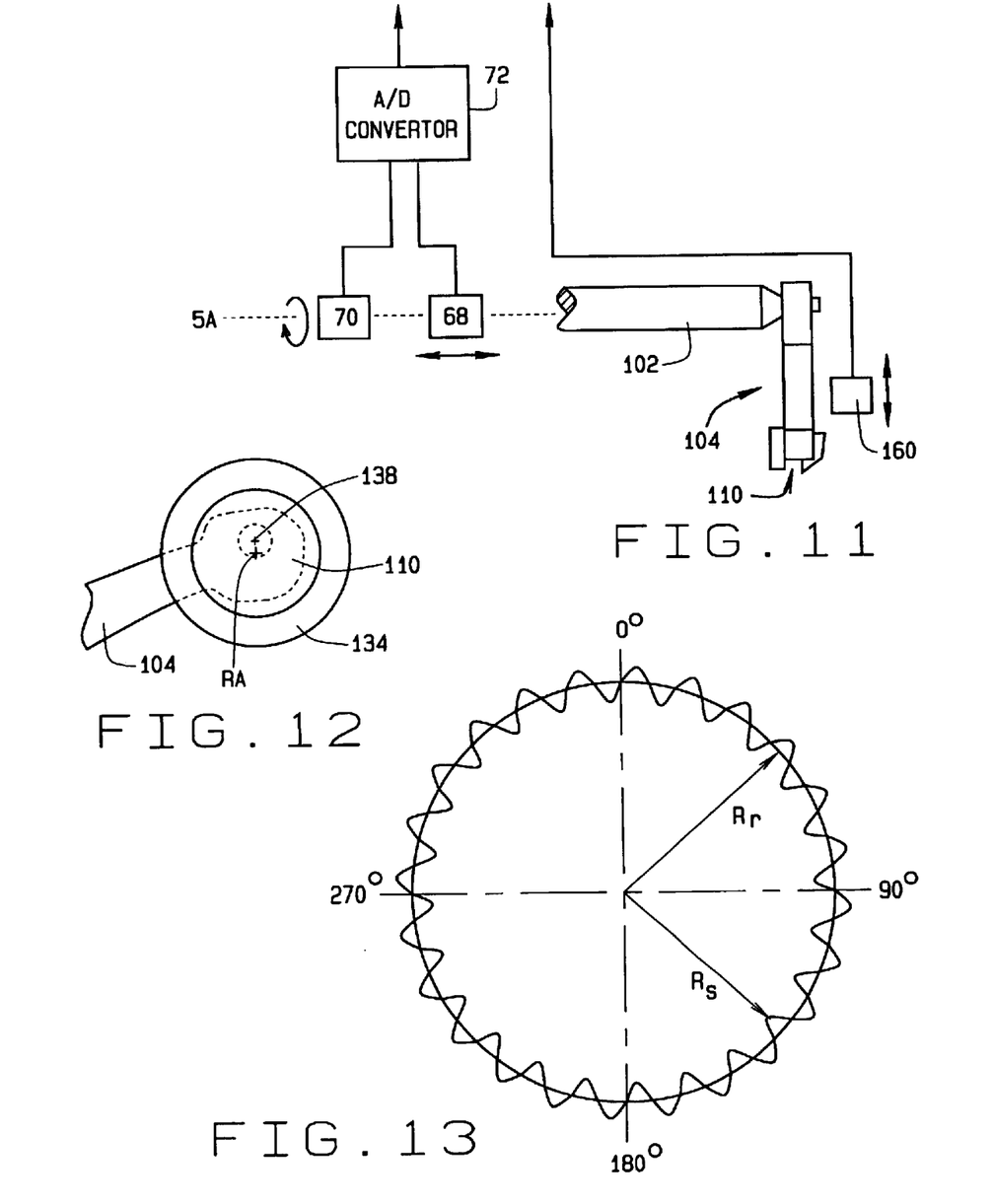
FIG. 11 is a block diagrammatic view of the various movement sensors associated with the adjustable wheel data acquisition arm of FIG. 6.
FIG. 12 is a partial side view of an alternate embodiment roller head.
FIG. 13 is a graphical representation of the cyclical variation in rotational position for an adjustable wheel data acquisition arm configured with the roller head of FIG. 12, during a wheel rim measurement procedure.

In one embodiment, an operator provides an indication to the central processing unit 32 of the wheel balancer 60 as to the extension of the sliding member 124. Alternatively, as is shown in FIG. 11, a position sensor 160 is associated with the rim contact arm 104, in addition to displacement sensor 68 and rotation sensor 70. Position sensor 160 is configured to provide a signal to the central processing unit 32 of the wheel balancer system which is representative of the extension of the sliding member 124.

For example, position sensor 160 may consist of a mechanical switch disposed in operative relationship to the sliding member 124, such that displacement of the sliding member from the first or retracted position to the second or extended position toggles the mechanical switch between a first and second state. Corresponding electrical signals from the mechanical switch are transmitted to the central processing unit 32 through associated wires or other conventional electrical circuits.

Those of ordinary skill in the art will recognize that the position sensor 160 may consist of any of a variety of conventional electrical, mechanical or optical position detection apparatus. For example, an LVDT or potentiometer circuit may be operatively coupled to the sliding member 124 to generate a signal proportional to the position of the sliding member 124 relative to the passage 126, or an optical sensor may be disposed to view one or more gradient markings on the sliding member 124, or to obtain one or more images indicative of the position of the sliding member 124. An ultrasonic sensor may be used to sense the position of the sliding member as well.

In an optional embodiment, shown in FIG. 12, the requirements for both operator positional input or a position sensor 160 are eliminated by mounting the roller 134 on the roller head 110 such that the roller rotational axis RA is displaced in a predetermined manner from the axis of shaft 138. When the roller 134 is brought into contact with the wheel rim 14, and the wheel rim 14 driven through at least one complete rotation, the eccentric mounting of the roller 134 will cause a high-frequency cyclical variation in the rotational position of the wheel data acquisition arm 104.

As shown in FIG. 13, this high-frequency cyclical variation is readily detectable in the signal from the rotational position sensor 70 operatively coupled to the shaft 102. For purposes of the example shown in FIG. 13, rim runout is assumed to be zero. As wheel rim 14 rotates through a 360° revolution, the radius of the wheel at the point of contact with the roller 134 remains essential constant, as represented by the circle with radius $R_r$. However, the radial distance from the axis of rotation of the wheel rim 14 to the axis of rotation of roller 134 will vary in a sinusoidal pattern, as shown by $R_s$ in FIG. 13. Since the amplitude of the sinusoidal pattern is known, based on the eccentric mounting of the roller 134, and the frequency of the sinusoidal pattern is known to be significantly higher than that induced by any runout or wheel rim deviations, the effect of this sinusoidal pattern can be subsequently filtered from the signal generated by the shaft rotational position sensor 70, permitting rim runout measurements to be obtained.

The signal from the rotational position sensor 70 is analyzed using Fast Fourier Transform analysis, or another suitable signal analysis process, by the central processing unit 32 to either identify the number or rotations or cycles of the roller 134 for each complete rotation of the vehicle wheel rim, or the first harmonic frequency of the cyclical variation. The central processing unit 32 is further configured to use this information, together with the known dimensions of the roller 134 and the signal indicating the actual rotational position of the wheel data acquisition arm shaft 102, to determine the radius of wheel rim 14. In addition, the central processing unit 32 is configured to identify if the sliding member 124 is in the first or retracted position, or the second or extended position, based upon the same information and the known geometry of the wheel balancer system 60 and wheel data acquisition arm 100.

For example, if there is no overlap in the range of wheel rim diameters which are contacted by the roller 134 in the first or retracted position and in the second or extended position, then identification of the wheel rim diameter from the sinusoidal signal generated by the roller 134 provides a positive identification of the position of the sliding member 124. If, however, there is a degree of overlap between the two ranges of wheel rim diameters, such as shown in FIG. 10, the simple geometry of the wheel balancer 60 and the wheel data acquisition arm 100 dictates a known correlation between the rotational position of the wheel data acquisition arm shaft 102 known from sensor 70, the determined wheel rim diameter, and the unknown position of the sliding member 124, permitting the central processing unit 32 to identify the correct position.

In an alternate embodiment suitable for use with wheel balancer or wheel vibration control systems including a second, outer wheel data acquisition arm 61 and an associated roller or ball 63, an approximate wheel rim diameter measurement is directly obtained. The outer wheel data acquisition arm 61 is moved such that the roller or ball 63 is brought into contact with the outer wheel rim lip 18. Using a rotational position sensor (not shown) coupled to the outer wheel data acquisition arm 61, an approximate wheel rim diameter at the contact point of the roller or ball 63 may be obtained from the measured rotational position and known geometry of the outer wheel data acquisition arm 61. The approximate wheel rim diameter is utilized, as previously described, by the central processing unit 32 to identify if the sliding member 124 is in the first or retracted position, or in the second or extended position, based upon the known geometry of the wheel balancer system 60 and wheel data acquisition arm 100.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In a wheel balancer having a shaft adapted for receiving a wheel assembly, said shaft having a longitudinal axis and being rotatable about said axis so as to rotate a wheel assembly removably mounted thereon; a sensor assembly for measuring rotation of the shaft about its longitudinal axis; a drive system operatively connected to the shaft for controlling rotating said shaft about its longitudinal axis, thereby to rotate the wheel assembly; at least one force transducer configured for measuring imbalance of the wheel assembly; and a central processing unit configured to control the drive system and to utilize the measured imbalance to determining the magnitude and placement parameters of at least one imbalance correction weight; the improvement comprising:

an adjustable wheel data acquisition arm configured for adjustment, in a plane perpendicular to the shaft longitudinal axis, from at least a first operating position adapted for use with wheel assemblies having a first range of inner diameters, to at least a second operating position adapted for use with wheel assemblies having a second range of inner diameters which differ, at least in-part, from said first range of inner diameters.

2. The improved wheel balancer of claim 1 wherein said adjustable wheel data acquisition arm includes a sliding member configured to slide between a retracted position and an extended position;

wherein said retracted position is adapted for use with wheel assemblies having said first range of inner diameters; and wherein said extended position is adapted for use with wheel assemblies having said second range of inner diameters.

3. The improved wheel balancer of claim 2 wherein said sliding member is configured for releasable engagement in said retracted positions; and wherein said sliding member is configured for releasable engagement in said extended position.

4. The improved wheel balancer of claim 1 further including a positional sensor disposed in operative relationship to said adjustable wheel data acquisition arm, said positional sensor configured to generate a signal representative of an operating position of said adjustable wheel data acquisition arm; and wherein said central processing unit is configured to utilize said signal to identify an operating position of said adjustable wheel data acquisition arm.

5. The improved wheel balancer of claim 4 wherein said positional sensor is a mechanical switch.

6. The improved wheel balancer of claim 4 wherein said positional sensor is an electrical circuit.

7. The improved wheel balancer of claim 4 wherein said positional sensor is an optical sensor.

8. The improved wheel balancer of claim 4 wherein said positional sensor is disposed remotely from said adjustable wheel data acquisition arm.

9. The improved wheel balancer of claim 1 further including:

a rotational position sensor operatively coupled to said adjustable wheel data acquisition arm, said rotational position sensor configured to generate a signal representative of a rotational position of said adjustable wheel data acquisition arm;

wherein said adjustable wheel data acquisition arm includes a roller configured for contacting an inner surface of the wheel assembly, and said roller having an eccentric mount adapted to induce a cyclical variation in a rotational position of said wheel data acquisition arm when said roller is in contact with an inner surface of a rotating wheel assembly; and wherein said central processing unit is further configured to receive said rotational position signal from said rotational position sensor, and to utilize a cyclical variation in said rotational position signal to identify an operating position of said adjustable wheel data acquisition arm.

10. The improved wheel balancer of claim 9 wherein said central processing unit is further configured to utilize said rotational position signal together with said cyclical variation in said rotational position signal to identify an operating position of said adjustable wheel data acquisition arm.

11. The improved wheel balancer of claim 1 further including a keypad input, wherein said central processing unit is further configured to receive, through said keypad input, operator identification of an operating position of said adjustable wheel data acquisition arm.

12. The improved wheel balancer of claim 1 wherein said central processing unit is further configured to (a) receive data related to a wheel diameter measurement; and (b) utilize at least said received data to identify an operating position of said adjustable wheel data acquisition arm.

13. The improved wheel balancer of claim 12, further including an outer wheel data acquisition arm having a predetermined configuration and at least one rotational position sensor operatively coupled to said outer wheel data acquisition arm; and wherein said central processing unit is configured to receive signals from said at least one rotational position sensor related to a wheel diameter measurement.

14. A method for determining an operational position of an adjustable wheel data acquisition arm in a vehicle wheel balancer system having a rotatable shaft for mounting a wheel assembly and an outer wheel data acquisition arm assembly configured to acquire data representative of an outer wheel diameter measurement, the method comprising the steps of:

mounting a wheel assembly on said rotatable shaft;

contacting an outer surface of said wheel assembly with said outer wheel data acquisition arm assembly;

acquiring data representative of an outer wheel diameter measurement at said contacted outer surface of said wheel assembly from said outer wheel data acquisition arm assembly;

contacting an inner surface of said wheel assembly with said adjustable wheel data acquisition arm; and utilizing at least said acquired data to identify an operational position of said adjustable wheel data acquisition arm.

15. A method for determining the inner diameter of a wheel assembly mounted on a vehicle wheel balancer rotating shaft, the method comprising the steps of:

contacting an inner surface of the wheel assembly with an eccentric roller having a predetermined geometry and eccentric mounting;

observing, through at least one complete rotation of the wheel assembly, a cyclical variation in the position of a support structure coupled to said eccentric roller; and utilizing at least said predetermined geometry and said observed cyclical variation for one complete rotation of the wheel assembly to identify an inner diameter of said wheel assembly.

16. A method for determining an operational position of an adjustable wheel data acquisition arm including an eccentric roller with a predetermined geometry in a vehicle wheel balancer system having a rotatable shaft for mounting a wheel assembly, the method comprising the steps of:

mounting a wheel assembly on said rotatable shaft;

contacting an inner surface of said wheel assembly with said eccentric roller;

rotating said wheel assembly through at least one complete rotation about a longitudinal axis of said rotatable shaft;

observing, through at least one complete rotation of said wheel assembly, a cyclical variation in the position of said adjustable wheel data acquisition arm; and utilizing at least said predetermined eccentric roller geometry and said observed cyclical variation for one complete rotation of the wheel assembly to identify an operational position of said adjustable wheel data acquisition arm.

17. A method for determining the inner diameter of a wheel assembly mounted on a vehicle wheel balancer rotating shaft, the method comprising the steps of:

positioning an extendable arm within the inner diameter of the wheel assembly;

rotating said extendable arm into contact with an inner surface of the wheel assembly;

observing the rotational position of said extendable arm in contact with said inner surface of the wheel assembly;

detecting an extension of said extendable arm;

utilizing said observed rotational position and said detected extension of said extendable arm to identify an inner diameter of said wheel assembly.

18. The method of claim 17 for determining the inner diameter of a wheel assembly further including the steps of:

observing, through at least one complete rotation of the wheel assembly, variations in the rotational position of said extendable arm in contact with said inner surface of the wheel assembly; and utilizing said observed variations in rotational position and said detected extension of said extendable arm to identify runout present in an inner diameter of said wheel assembly.

19. A method for measuring the inner diameter of a wheel assembly mounted on a wheel balancer having a shaft adapted for receiving the wheel assembly, the shaft having a longitudinal axis and being rotatable about the axis so as to rotate a wheel assembly, the method comprising the steps of:

removably mounting the wheel assembly to the rotatable shaft;

adjusting, in a plane perpendicular to the rotatable shaft longitudinal axis, a length of said wheel data acquisition arm; and utilizing said adjusted wheel data acquisition arm to acquire at least one measurement functionally related to the inner diameter of the wheel assembly.

20. The method of claim 19 for measuring the inner diameter of a wheel assembly further including the step of utilizing said adjusted length together with said acquired at least one measurement to measure the inner diameter of the wheel assembly.

21. The method of claim 19 for measuring the inner diameter of a wheel assembly wherein said adjusted length corresponds to an operating position selected from a set of operating positions including a first operating position adapted for use with wheel assemblies having a first range of inner diameters, and at least a second operating position adapted for use with wheel assemblies having a second range of inner diameters which differ, at least in-part, from said first range of inner diameters.

* * * * *